US009619795B2

(12) United States Patent
Simpkins et al.

(10) Patent No.: US 9,619,795 B2
(45) Date of Patent: Apr. 11, 2017

(54) APPARATUS, SYSTEM, AND METHODS FOR RETROFITTING VENDING SYSTEMS WITH WIRELESS COMMUNICATION

(71) Applicant: USA TECHNOLOGIES, INC., Malvern, PA (US)

(72) Inventors: Joseph A. Simpkins, West Chester, PA (US); Thomas J. Cattani, King of Prussia, PA (US)

(73) Assignee: USA Technologies, Inc., Malvern, PA (US)

( * ) Notice: Subject to any disclaimer, the term of this patent is extended or adjusted under 35 U.S.C. 154(b) by 0 days.

(21) Appl. No.: 14/681,463

(22) Filed: Apr. 8, 2015

(65) Prior Publication Data
US 2015/0287008 A1 Oct. 8, 2015

Related U.S. Application Data

(60) Provisional application No. 61/976,580, filed on Apr. 8, 2014.

(51) Int. Cl.
G06F 7/08 (2006.01)
G06Q 20/32 (2012.01)
H04W 4/00 (2009.01)
G06Q 20/34 (2012.01)
G07F 7/08 (2006.01)
G07F 9/00 (2006.01)
G07F 9/10 (2006.01)
G06K 7/10 (2006.01)

(52) U.S. Cl.
CPC ..... *G06Q 20/3278* (2013.01); *G06K 7/10336* (2013.01); *G06Q 20/34* (2013.01);
(Continued)

(58) Field of Classification Search
CPC .... G06K 7/0008; G06Q 20/347; G06Q 30/02; G06Q 30/0207; G07F 7/0866; G07F 7/0873; G07F 7/0893
(Continued)

(56) References Cited

U.S. PATENT DOCUMENTS 7,516,887 B2 * 4/2009 Arakaki ............... G06Q 20/347
235/380
7,934,646 B2 * 5/2011 Yang .................. G06Q 20/3278
235/381
(Continued)

FOREIGN PATENT DOCUMENTS

CN 202632387 12/2012
DE 10318672 11/2004
(Continued)

OTHER PUBLICATIONS

International Search Report mailed Jul. 10, 2015 for International Application No. PCT/US2015/024892, 5 pages.
(Continued)

Primary Examiner — Seung Lee
(74) Attorney, Agent, or Firm — RatnerPrestia

(57) ABSTRACT

Retrofitted vending systems including a card reader and a vending machine in communication with the card reader are disclosed. The systems may include a spacer positioned between the card reader and the vending machine that is adapted for mounting the card reader to the vending machine. Wireless communication device are also disclosed. The wireless communication devices may be electronically coupled to the vending machine and may include a bracket configured for attachment in the spacer and a wireless communication board fastened to the bracket.

29 Claims, 12 Drawing Sheets

(52) U.S. Cl.
CPC .......... *G07F 7/0873* (2013.01); *G07F 7/0893* (2013.01); *G07F 9/00* (2013.01); *G07F 9/10* (2013.01); *H04W 4/008* (2013.01); *Y10T 29/49117* (2015.01)

(58) Field of Classification Search
USPC ........................................................ 235/381
See application file for complete search history.

(56) References Cited

U.S. PATENT DOCUMENTS

| | | | |
|---|---|---|---|
| 8,387,872 B2* | 3/2013 | Buffa | ............................ 235/381 |
| 2008/0236991 A1 | 10/2008 | Arakaki | |
| 2009/0218395 A1* | 9/2009 | Chien | ....................... G07F 7/04 235/380 |
| 2014/0026224 A1 | 1/2014 | Kuo | |

FOREIGN PATENT DOCUMENTS

| | | |
|---|---|---|
| JP | 2001283301 | 10/2001 |
| JP | 2003030604 | 1/2003 |
| KR | 100227721 | 11/1999 |
| WO | 2009138404 | 11/2009 |
| WO | 2013078373 | 5/2013 |

OTHER PUBLICATIONS

International Preliminary Report on Patentability and Written Opinion issued Oct. 12, 2016 for International Application No. PCT/US2015/024892, 6 pages.

* cited by examiner

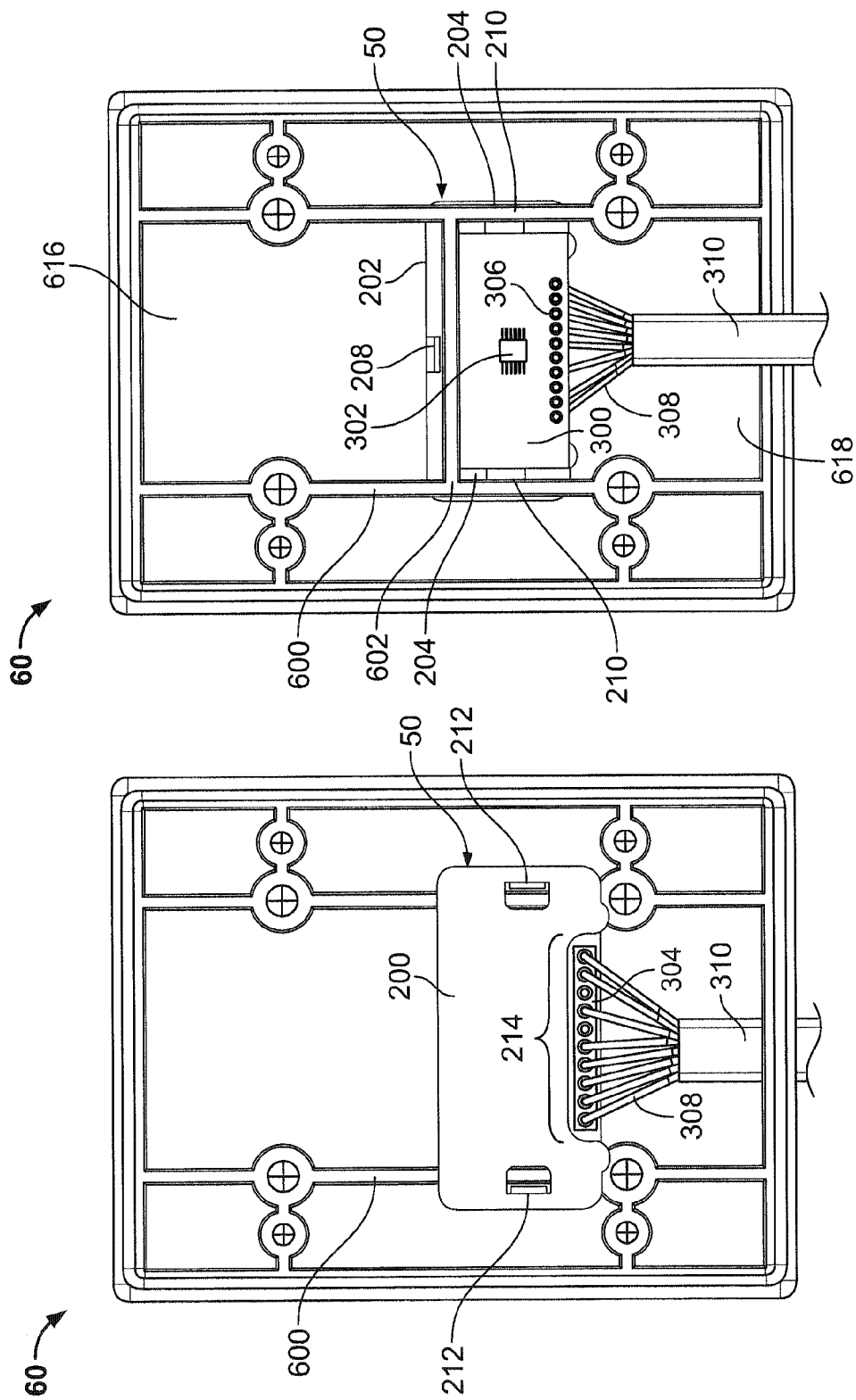

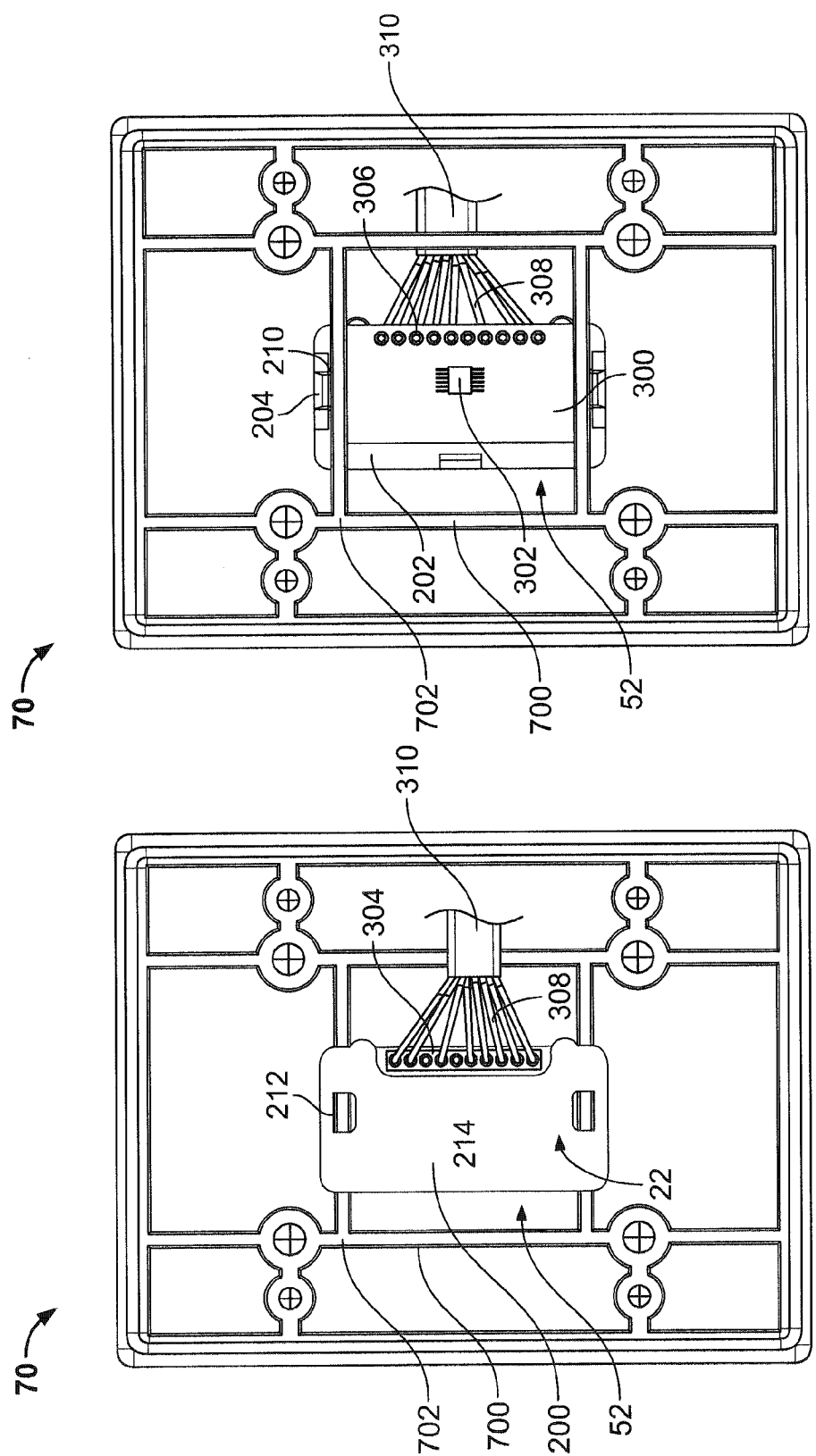

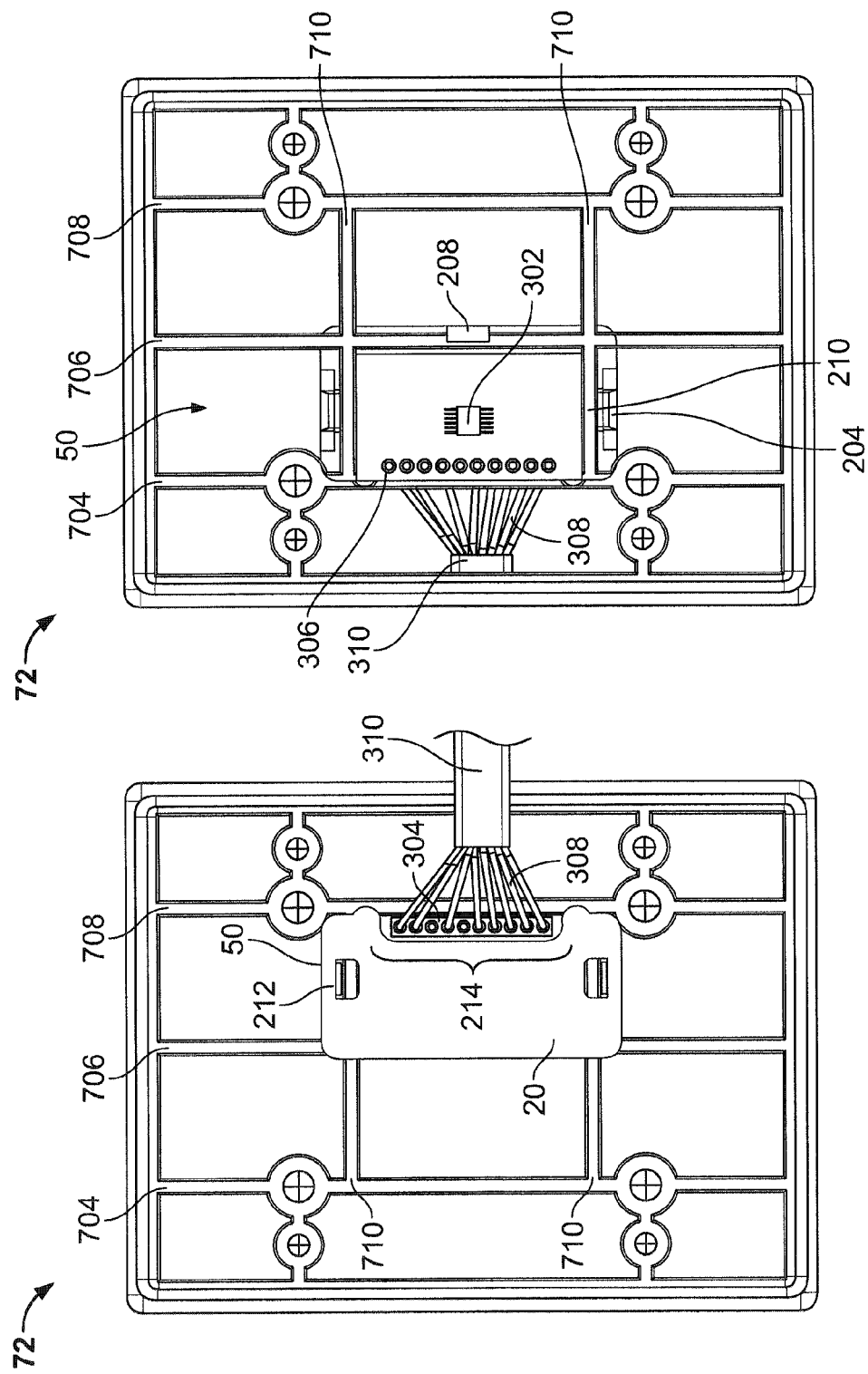

APPARATUS, SYSTEM, AND METHODS FOR RETROFITTING VENDING SYSTEMS WITH WIRELESS COMMUNICATION

CROSS-RELATED APPLICATIONS

This application claims the benefit of U.S. Provisional Application No. 61/976,580 entitled "Apparatus, System, and Methods for Retrofitting Vending Systems with Wireless Communication" filed on Apr. 8, 2014, the contents of which are incorporated by reference in their entirety herein.

FIELD OF THE INVENTION

The invention relates to wireless communication in vending systems.

BACKGROUND OF THE INVENTION

In recent years, wireless communication technology has advanced, providing new, more efficient ways of conducting transactions. However, older systems may not be equipped to benefit from the advancements of wireless communication technology. There exists a need for devices that permit older systems to benefit from such technology.

SUMMARY OF THE INVENTION

Aspects of the invention include vending systems with a card reader and a vending machine in communication with the card reader. The systems include a spacer positioned between the card reader and the vending machine and adapted for mounting the card reader to the vending machine. The systems also include a wireless communication device electronically coupled to the vending machine that has a bracket configured for attachment in the spacer and a wireless communication board fastened to the bracket.

Further aspects of the invention methods of retrofitting vending machines for wireless communication. The methods include fastening a wireless communication assembly to a bracket, attaching the bracket in a spacer, mounting a card reader to the vending machine via the spacer, and electronically coupling the wireless communication assembly to the vending machine.

Additional aspects of the invention include devices for retrofitting vending machines with wireless communication. Embodiments of the devices include a bracket with a fastening projection and a flange extending from an edge of the bracket. Embodiments of the devices also include a wireless communication assembly with a wireless communication board, a series of connections configured for electronic coupling of the board to the vending machine, and an aperture aligned with the fastening projection of the bracket for fastening the board to the bracket. The flange of the bracket is configured to engage a spacer and attach the device to the spacer. Embodiments of the devices also include a wireless communication device including a wireless communication module, wires coupled to the wireless communication module, and an attachment mechanism for attaching the wireless communication device to the vending machine. The wireless communication device may be attached and electronically coupled to the vending machine

BRIEF DESCRIPTION OF THE DRAWINGS

The invention is best understood from the following detailed description when read in connection with the accompanying drawings, with like elements having the same reference numerals. When a plurality of similar elements is present, a single reference numeral may be assigned to the plurality of similar elements with a small letter designation referring to specific elements. Included in the drawings are the following figures:

FIGS. 7A, 7B, 7C, 7D, 7E, and 7F depict wireless communication devices attached in spacers in accordance with aspects of the invention;

DETAILED DESCRIPTION OF THE INVENTION

Figure 1:
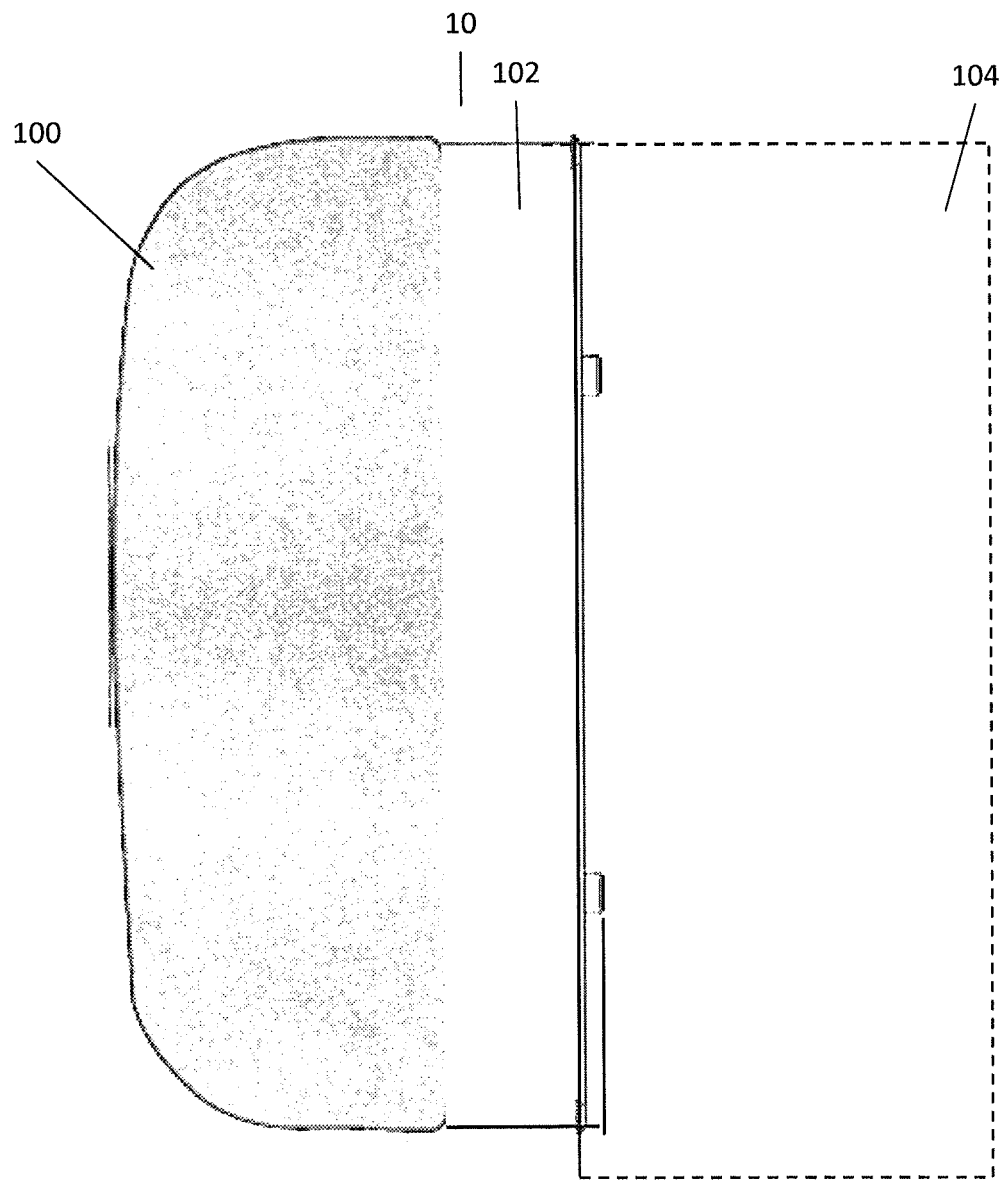
FIG. 1 is an illustration of a vending system according to aspects of the invention.
Figure 2A:
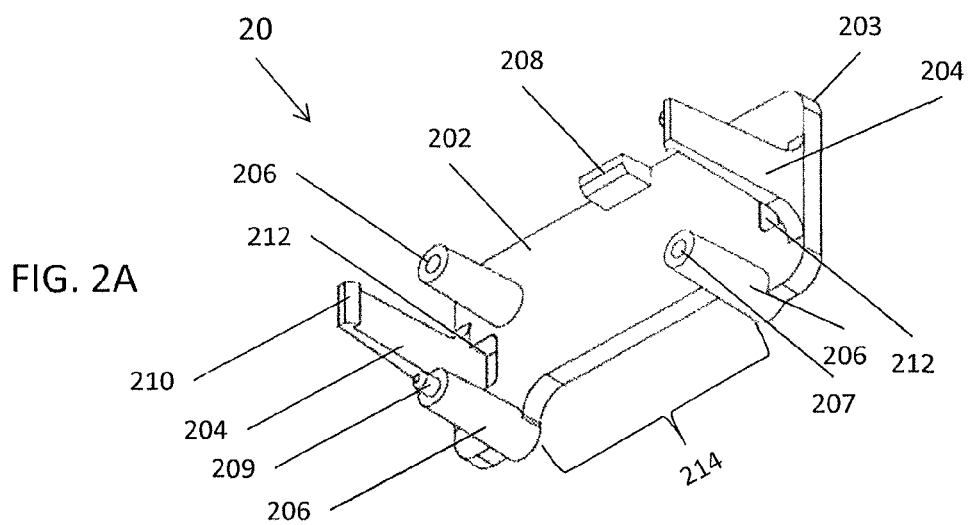
FIGS. 2A-2F are views of a bracket in accordance with aspects of the invention.
Figure 2B:
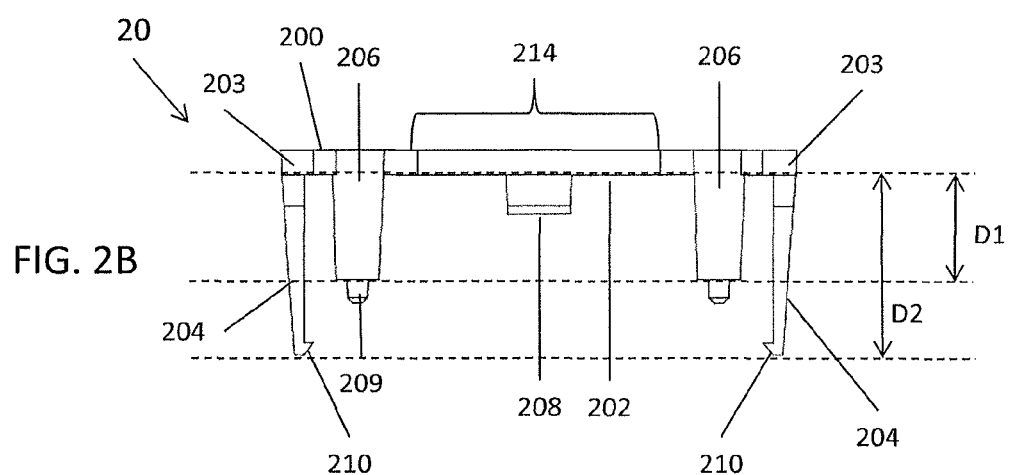
Figure 2C:
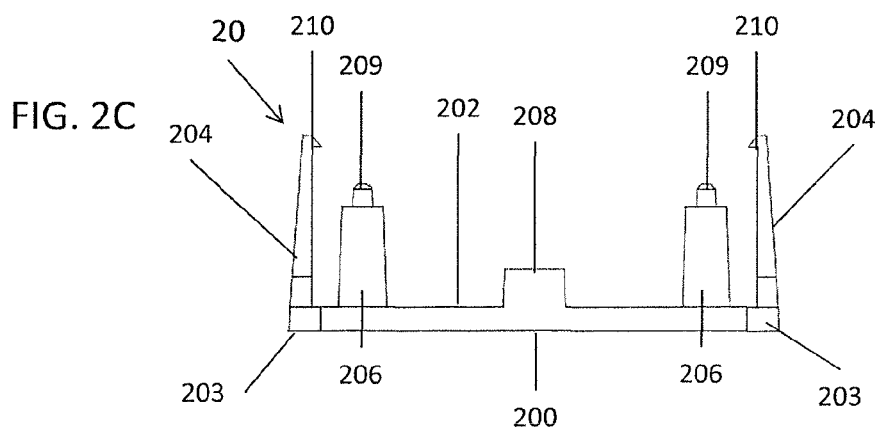
Figure 2D:
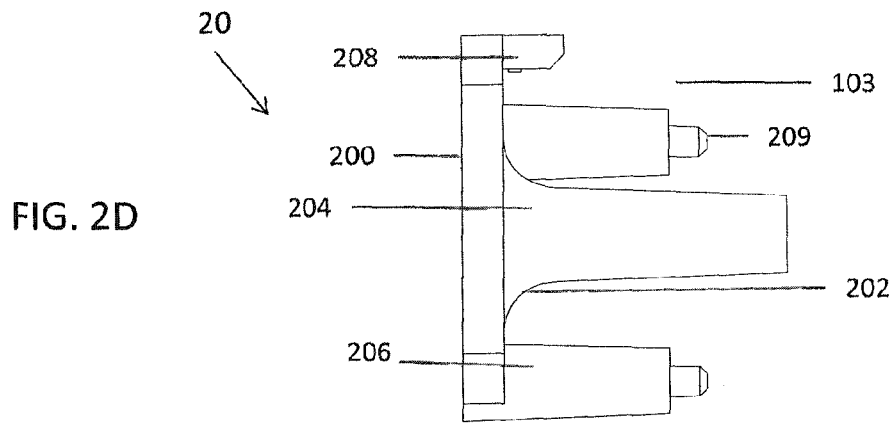
Figure 2E:
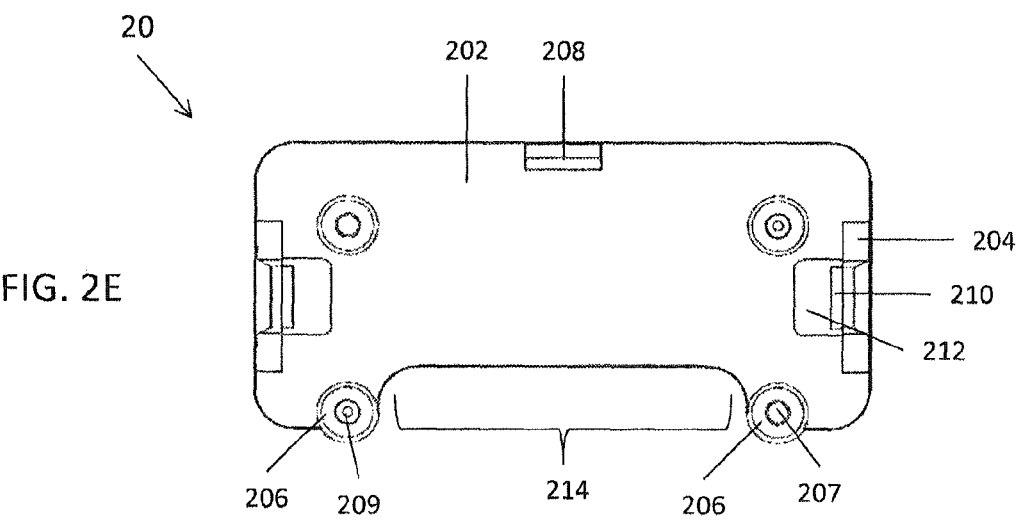
Figure 2F:
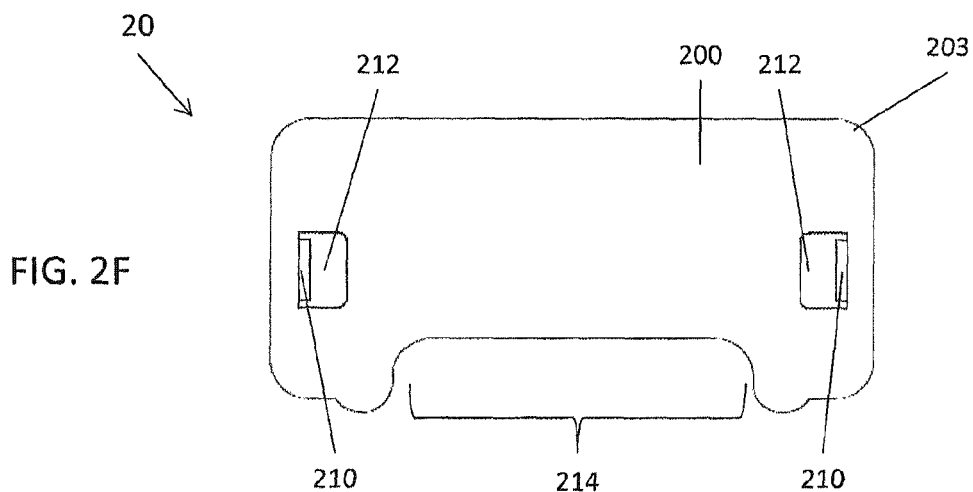

Referring to FIG. 1, a vending system without wireless communications is shown. The vending system 10 includes a card reader 100, a vending machine 104 in communication with the card reader 100, and a spacer 102 positioned between the card reader 100 and the vending machine 104. The card reader 100 can be configured to read credit cards, debit cards, gift cards, and other cards that can be used as a form of payment to vend items from the vending machine 104.

The spacer 102 is configured to receive the card reader 100 on one side and mount to the vending machine 104 on the other side, effectively mounting the card reader 100 to the vending machine 104. In an embodiment, the spacer 102 is designed to be stackable, as some vending machine systems require more than one spacer to mount to the card reader (e.g., card reader 100). For example, some vending machines may have plastic buttons and/or a whole face plate that protrude from the metal base of the vending machine. In order to swipe a card with a card reader, the card swipe area must be further away from buttons, face plates, and other features of the vending machine, such that the card can be cleanly swiped without physical obstructions. Spacers (e.g., spacer 102) are generally used to add clearance depth between the bottom of a card reader (e.g., card reader 100) and the front of the vending machine (e.g., vending machine 100), so that one can swipe a card without interference from the features of the vending machine. The general vending system 10 can be retrofitted for wireless communication with the card reader 100, the vending machine 104, and/or other devices within range (e.g., mobile cellular devices, computers, servers, etc.) as is described in detail below.

FIGS. 2A-2F depict various views of a bracket that is used in retrofitting vending systems for wireless communication according to aspects of the invention. The bracket 20 has a front surface 200 and a rear surface 202, with various features disposed on the rear surface 202. It will be understood that some or all of the features disposed on the rear surface 202 may also be disposed on the front surface 200. The bracket 20 includes rounded corners 203, flanges 204, fastening projections 206, a horizontal tab 208, gaps 212, and a concave portion 214.

The flanges 204 are relatively flexible to facilitate bending movement outwardly and inwardly with respect to the bracket 20. The flanges 204 extend from the rear surface 202 of the bracket 20 to a distance D2. At the top end of each of the flanges 204 are disposed lips 210 that extend inwardly toward the center of the bracket 20. Gaps 212 are positioned near the base of each flange 204 to partially facilitate manufacture of the bracket 20, the bending movement of the flanges 204 and viewing of the flanges 204 and lips 210 from the front surface 200 of the bracket 20. Although two flanges are shown, and the flanges are shown positioned on the outer side edges of the bracket, it will be understood from the description herein that fewer or more flanges may be used and may be positioned at alternative locations on the bracket 20. For example, a flange(s) may be positioned on the top and/or bottom edges of the bracket 20 in addition to or in place of the flanges 204 on the outer side edges of the bracket 20.

A tab 208 is positioned on the top edge of the bracket 20. The tab 208 is configured to prevent vertical translation and/or horizontal translation of the bracket 20 when the bracket 20 is attached in a spacer (items 60, 70 and 72 of FIGS. 7A-7F). The tab 208 may also include a lip such as lips 210 on flanges 204. The tab 208 can be positioned on the bottom edge of the bracket 20, on the front surface 200 of the bracket 20, or any other position that can prevent translation of the bracket 20 when the bracket 20 is attached in a spacer.

The bracket 20 also includes fastening projections 206 extending outwardly from the rear surface 202 that are adapted to fasten a wireless communication board (FIGS. 3A-3C) to the bracket 20. The fastening projections 206 extend to a distance D1 that is less than the distance D2 to which the flanges 204 extend. The ends of the fastening projections 206 include either a recess 207 or a locating pin 209. The recesses 207 are configured to receive fasteners (e.g., screws (not shown)) that can be inserted through apertures in a wireless communication board to facilitate fastening of the board to the bracket 20. The locating pins 209 extend outwardly from the ends of the projections 206 and are configured for insertion through apertures in a wireless communication board to facilitate positioning of the board to the bracket 20. It will be understood that the projections 206 may include several combinations of recesses and/or locating pins as is necessary for fastening and positioning a wireless communication board to the bracket based on specifications of such boards.

A concave portion 214 is formed in the bottom edge of the bracket 20 between two fastening projections 206. The concave portion 214 may facilitate bending and feeding of connector wires from a wireless communication board once the board is fastened to the bracket 20.

Figure 3A:
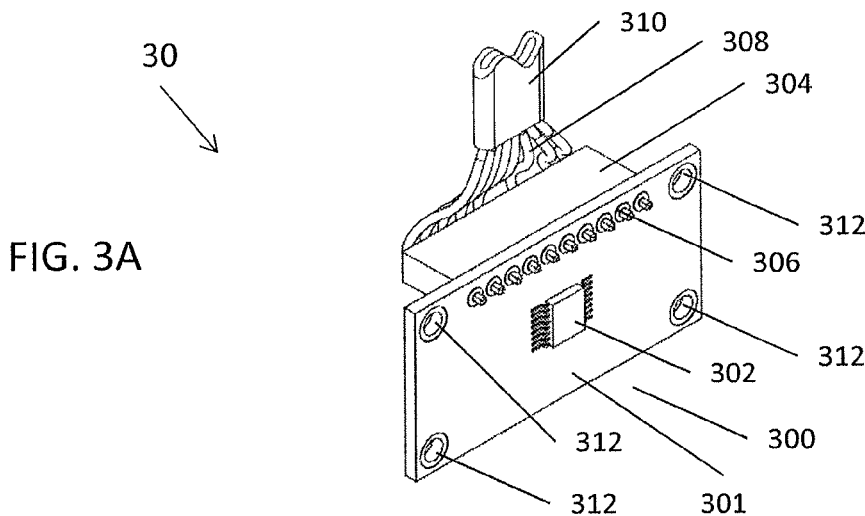
FIGS. 3A-3C are views of a wireless communication assembly according to aspects of the invention.
Figure 3B:
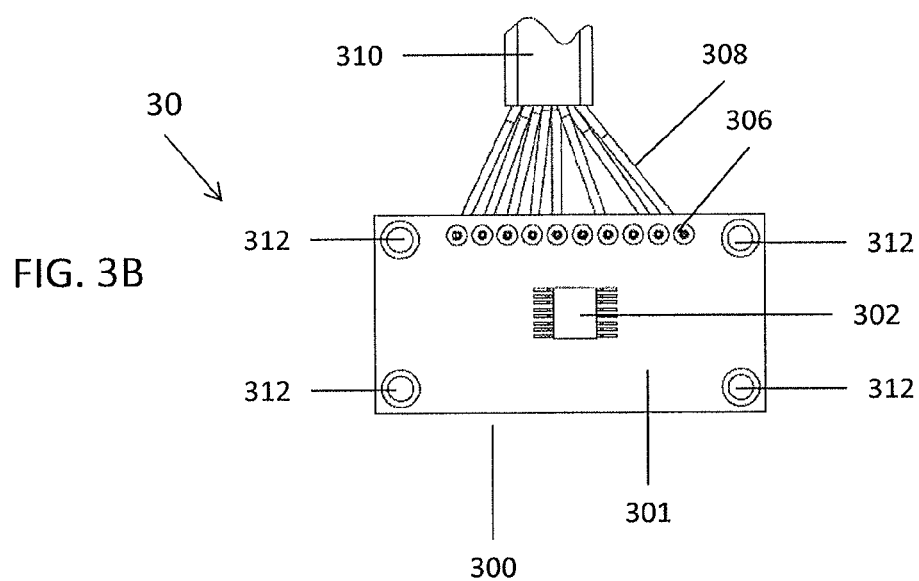
Figure 3C:
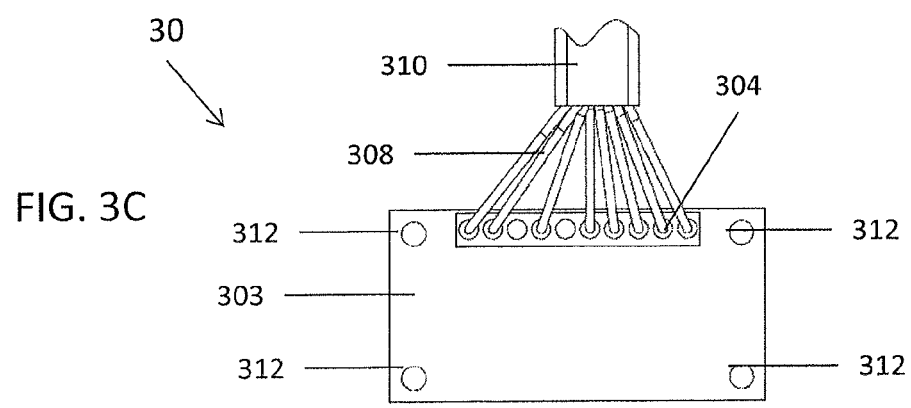

Referring next to FIGS. 3A-3C, various views of a wireless communication assembly is shown. The wireless communication assembly 30 includes a wireless communication board 300, a series of wires 308 in a sheath 310, and a header 304 connecting the wires 308 to the board 300. The wireless communication assembly 30 may be configured for wireless communications via Bluetooth, NFC, RF, Wi-Fi, local, etc. The bracket described above may also be configured to receive an assembly that includes optical sensors, speakers, microphones, cameras, etc. Advantageously, embodiments of the invention pertain to a spacer that can have attached in it an assembly for a variety of functions with which to retrofit a vending system (e.g., vending system 100) such that the assembly can be carried externally and securely to the vending system 100. Various applications with vending systems, communication kiosks, mobile users, mobile devices, other systems and kiosks, and access points, or the like will benefit from the externally and securely attached assemblies in spacers disclosed herein.

The wireless communication board 300 may be water-proofed. In an embodiment, the wireless communication board 300 is water-proofed by coating the board with a conformal coating.

The wireless communication board 300 includes a front surface 301 and a rear surface 303. A wireless communication module 302 is installed on the front surface 301 of the board 300. The module 302 may be alternatively installed on the rear surface 303. The module 302 may be any module configured to facilitate wireless communication, such as Bluetooth, NFC, Wi-Fi, RF, etc. The board 300 also includes apertures 312 that are configured to facilitate positioning and attachment of the board 300 to the bracket 20 via the fastening projections 206 on the bracket 20. The front surface 301 includes a series of connections 306 that are terminated from the wires 308. The connections 306 provide power to the board 300 and are electronically coupled to a device (e.g., a vending machine) for effectuating the functions of the board 300 with the device. Other functional components of the board 300 are described at FIG. 9. The components of the board 300 may be installed on one side, or both sides of the board 300 (e.g., a double-sided wireless communication board). Other suitable configurations and arrangements of the components of the board 300 will be understood by one of skill in the art from the description herein.

Figure 4:
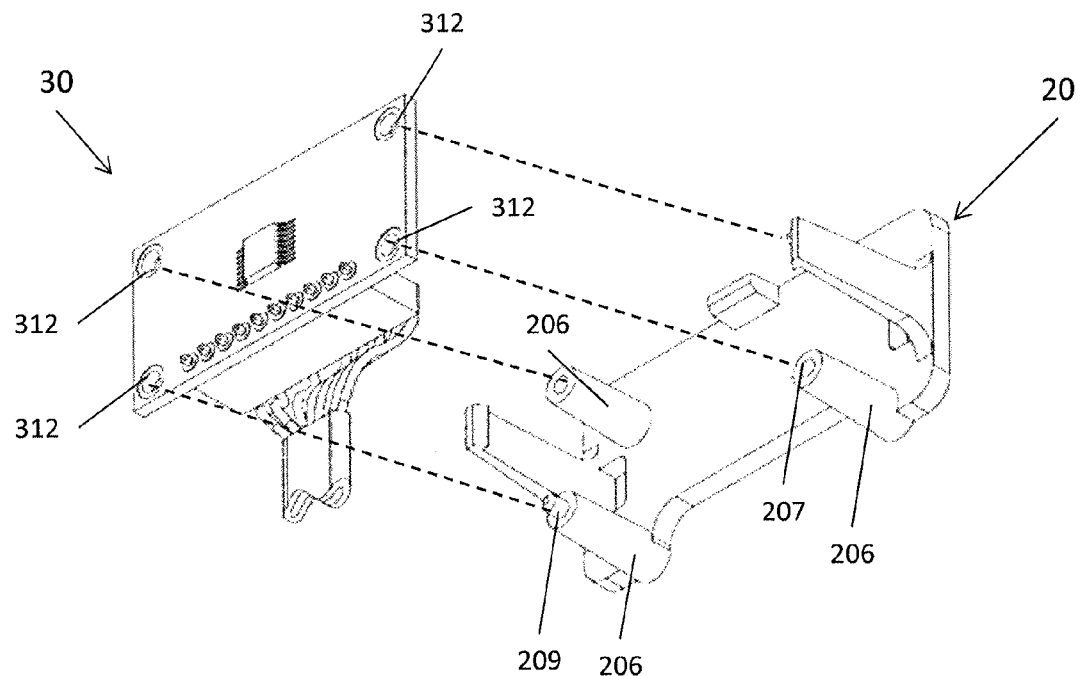
FIG. 4 is an isometric view depicting alignment of a bracket with a wireless communication assembly according to aspects of the invention.

FIG. 4 shows an alignment of the wireless communication assembly 30 with the bracket 20. The apertures 312 of the board 300 are arranged to be aligned with the fastening projections 206 of the bracket. The apertures 312 are placed over the fastening projections 206, and the locating pins 209 are fed through the apertures 312 and/or a fastener (e.g., a screw (not shown)) is fed through the apertures 312 into the recesses 207, depending on whether the projections 206 include a recess 207 or a locating pin 209. Although four apertures are shown, it is contemplated that fewer or more apertures may be utilized to fasten the board 300/assembly 30 to the bracket 20.

Figure 5:
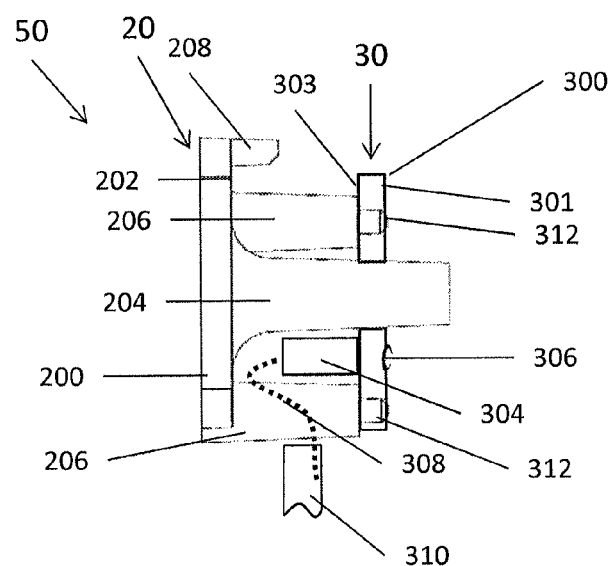
FIG. 5 is a side view of a wireless communication device in accordance with aspects of the invention.

Referring to FIG. 5, a wireless communication device 50 is shown. The wireless communication device 50 is formed by fastening the wireless communication assembly 30 to the bracket 20. The apertures 312 and projections 206 are positioned between the flanges 204 of the bracket 20, such that when the board 300 is fastened to the bracket 20, the front surface 301 of the board 300 does not extend laterally to the flanges 204. The projections 206 extend to a distance (D1 of FIG. 2B) and the board 300 is sufficiently thin such that, when the board 300 is fastened to the bracket 20, the board 300 remains spaced from the lips 210 of the flanges 204. The spacing between the board 300 and the lips 210 are such that the bracket 20 can be attached in a spacer without contacting the board 300 with the spacer, as is described in detail at FIGS. 7A-7F. Additionally, the top edge of the board 300 is positioned below the tab 208. The positions of the flanges 204 and the tab 208 with respect to the fastening projections 206 ensure that the flanges 204 and tab 208 remain substantially out of contact with the board 300 of the assembly 30, thereby preventing interference with the functional components of the assembly 30.

The rear surface 303 of the board 300 is spaced from the rear surface 202 of the bracket 20 at a sufficient distance such that the header 304 fits between the rear surface 303 and rear surface 202. Additionally, sufficient distance between the header 304 and the rear surface 202 of the bracket 20 is maintained such that the wires 308 can fall downward from the bracket 20 and the assembly 30 near the concave portion 214.

Figure 6A:
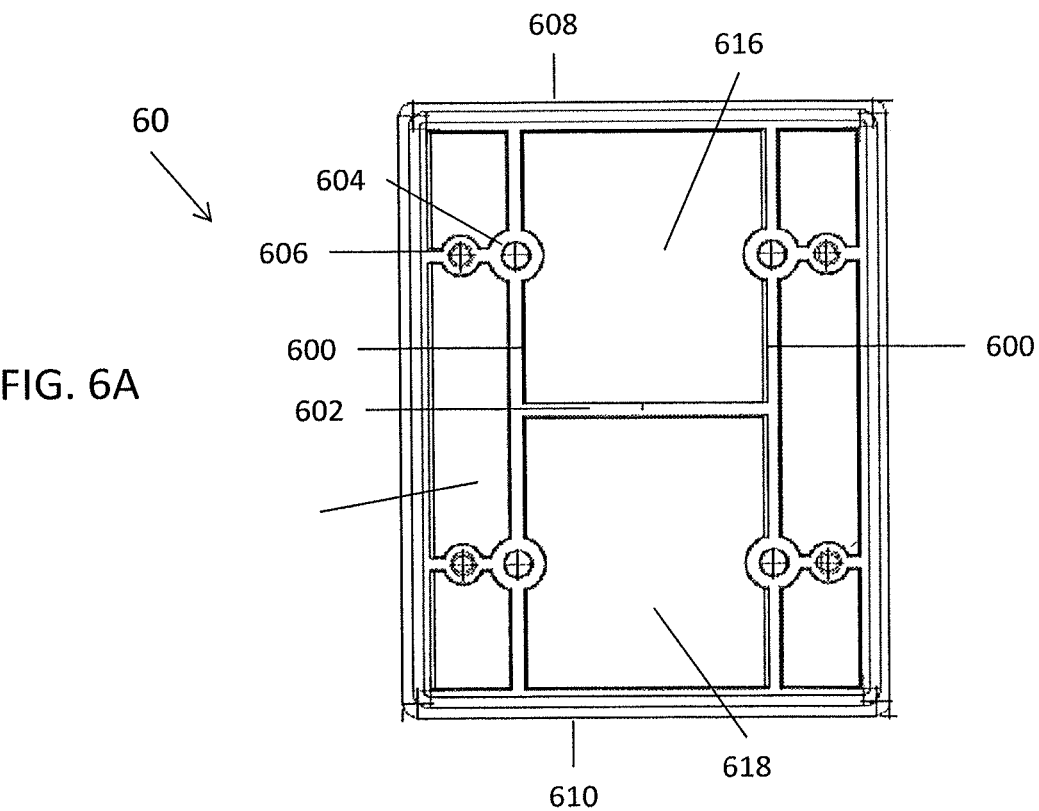
FIGS. 6A and 6B are views of a spacer according to aspects of the invention.
Figure 6B:
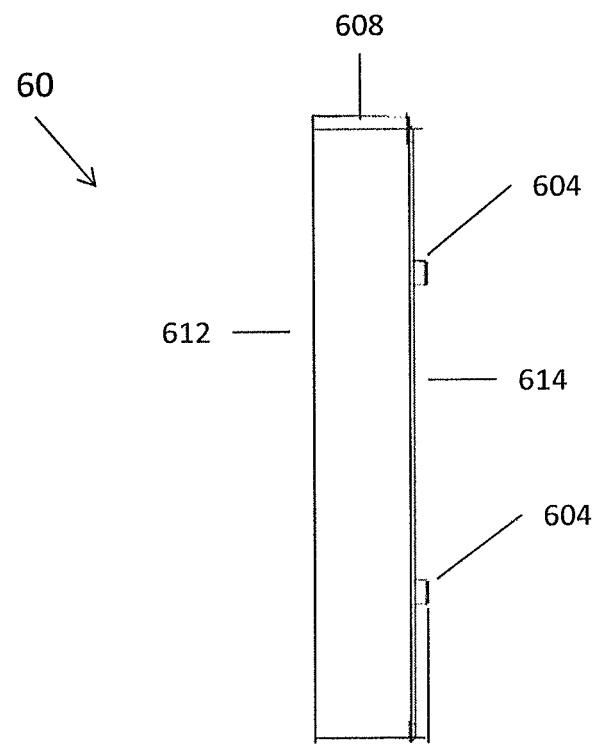

Referring next to FIGS. 6A and 6B, views of an example of a spacer for mounting a card reader to a vending machine are shown according to aspects of the invention. The spacer 60 includes an arrangement of bars and mounting holes. The spacer 60 includes two vertical bars 600 that extend from the top end 608 to the bottom end 610 of the spacer. Between the vertical bars 600 is a horizontal bar 602. The spacer 60 includes a series of card reader mounting holes 606 for attaching a card reader (e.g., card reader 100) to the front side 612 of the spacer 60. In an alternative embodiment, the mounting holes 606 are replaced with alignment pins configured to align a card reader, vending machine, and/or another spacer to the spacer 60. The spacer 60 also includes a series of vending machine mounting holes 604 for attaching the rear side 614 of the spacer 60 to a vending machine (e.g., vending machine 104). Multiple spacers may be used in mounting a card reader to a vending machine, and machine screws may be fed from a vending machine adapter plate (not shown), through mounting holes (e.g., mounting holes 604) in the spacer(s) into corresponding holes in the card reader. The vertical bars 600 and the horizontal bars 602 are arranged to be engaged by the bracket 20. Openings 616, 618 are formed in the spacer 60 from the arrangement of the bars 600 and 602 that allow for ease of access to the spacer 60 and also permit objects, such as wires, to be fed through the openings to other components of a vending system, such as a card reader (e.g., card reader 100), vending machine (e.g., vending machine 104), etc.

At FIGS. 7A-7F, a wireless communication device attached to various examples of spacers is shown according to aspects of the invention. Referring to FIGS. 7A and 7B, the wireless communication device 50 is mounted to the vertical bars 600 of the spacer 60. The bracket 20 is engaged to the vertical bars 600 such that the flanges 204 are in contact with the vertical bars 600. The bracket 20 can then be pushed such that the flanges 204 flex outwardly with respect to the bracket 20 due to the contact between the lips 210 of the flanges 204 and the sides of the vertical bars 600. Once the lips 210 of the flanges 204 extend past the depth of the vertical bars 600, the flanges 204 return to the unflexed position. In the unflexed position, the lips 210 of the flanges 204 extend over the rear side vertical bars 600 and engage the vertical bars 600, thereby attaching the wireless communication device 50 to the spacer 60. To remove the wireless communication device 50 from the spacer 60, the flanges 204 can be flexed outwardly with respect to the bracket 20, disengaging the lips 210 from the vertical bars 600, permitting the wireless communication device 50 to be removed from the spacer 60.

When the wireless communication device 50 is being attached to the spacer 60, the vertical bars 600 can be viewed from the gaps 212 of the bracket 20 to assist in the alignment and attachment of the device 50 to the spacer 60. When attached, the tab 208 can extend over the horizontal bar 602, which prevents the device 50 from translating vertically downward along the vertical bars 600. The features of the bracket 20 and the wireless communication assembly 30 are advantageously arranged and positioned such that the board 300 is substantially out of physical contact with the bars 600, 602 of the spacer 60 both during attachment of the device 50 and while the device 50 is attached in the space. This advantageously prevents damage to and interference from the bars 600 and 602 with the functionality of the board 300. The wires 308 and/or sheath 310 can be fed through the opening 618 to a vending machine (e.g., vending machine 100) to be electronically coupled to the vending machine or other component within the vending machine, such as a vending machine controller (VMC), a vending interface controller that is coupled to the VMC, a second wireless communication device, etc.

Referring next to FIGS. 7C and 7D, the wireless communication device 52 is mounted to the horizontal bars 702 of the spacer 70 according to aspects of the invention. The bracket 22 of the wireless communication device 52 differs from the bracket 20 of the wireless communication device 50 in that the bracket 22 does not utilize a tab, such as tab 208 of bracket 20. The bracket 22 is engaged to the horizontal bars 702 such that the flanges 204 are in contact with the horizontal bars 702. The bracket 22 can then be pushed such that the flanges 204 flex outwardly with respect to the bracket 22 due to the contact between the lips 210 of the flanges 204 and the sides of the horizontal bars 702. Once the lips 210 of the flanges 204 extend past the depth of the horizontal bars 702, the flanges 204 return to the unflexed position. In the unflexed position, the lips 210 of the flanges 204 extend over the rear side of the horizontal bars 702 and engage the horizontal bars 702, thereby attaching the wireless communication device 52 to the spacer 70. To remove the wireless communication device 52 from the spacer 70, the flanges 204 can be flexed outwardly with respect to the bracket 22, disengaging the lips 210 from the horizontal bars 702, permitting the wireless communication device 52 to be removed from the spacer 70.

The wireless communication device 52 may be mounted substantially in the center of the spacer 70, such that the bracket 22 does not utilize a tab. When the wireless communication device 52 is being attached to the spacer 70, the horizontal bars 702 can be viewed from the gaps 212 of the bracket 22 to assist in the alignment and attachment of the device 52 to the spacer 70. The features of the bracket 22 and the wireless communication assembly 30 are advantageously arranged and positioned such that the board 300 is substantially out of physical contact with the bars 700, 702 of the spacer 70 both during attachment of the device 52 and while the device 52 is attached in the spacer 70. This advantageously prevents damage to and interference from the bars 700 and 702 with the functionality of the board 300.

At FIGS. 7E-7F, a wireless communication device is shown mounted to another example of a spacer according to aspects of the invention. The spacer 72 includes a series of vertical bars 704, 706, and 708, along with horizontal bars 710. The bracket 20 is engaged to the horizontal bars 710 at an off-center position with respect to the spacer 72. The flanges 204 are in contact with the horizontal bars 710. The bracket 20 can then be pushed such that the flanges 204 flex outwardly with respect to the bracket 20 due to the contact between the lips 210 of the flanges 204 and the sides of the horizontal bars 710. Once the lips 210 of the flanges 204 extend past the depth of the horizontal bars 700, the flanges 204 return to the unflexed position. In the unflexed position, the lips 210 of the flanges 204 extend over the rear side of the horizontal bars 710 and engage the horizontal bars 710, thereby attaching the wireless communication device 50 to the spacer 72. To remove the wireless communication device 50 from the spacer 72, the flanges 204 can be flexed outwardly with respect to the bracket 20, disengaging the lips 210 from the horizontal bars 710, permitting the wireless communication device 50 to be removed from the spacer 72.

When the wireless communication device 50 is being attached to the spacer 72, the horizontal bars 710 can be viewed from the gaps 212 of the bracket 20 to assist in the alignment and attachment of the device 50 to the spacer 72. The bracket 20 includes a tab 208 that extends over the center vertical bar 706, to prevent horizontal translation of the bracket 20 when the wireless communication device 50 is mounted in the spacer 72. The features of the bracket 20 and the wireless communication assembly 30 are advantageously arranged and positioned such that the board 300 is substantially out of physical contact with the bars 704, 706, 708, and 710 of the spacer 72 both during attachment of the device 50 and while the device 50 is attached in the spacer 72. This advantageously prevents damage to and interference from the bars 704, 706, 708, 710 with the functionality of the board 300. Other suitable spacers with various arrangements of bars for the attachment of the wireless communication devices will be understood by one of skill in the art from the description herein.

It will be understood that various positions and arrangements of the devices 50, 52 with respect to the spacers 60, 70, 72 can be used to effectuate the invention. For example, the devices 50, 52 may be attached to the spacers 60, 70, 72 at any position along the bars of the spacers. The wires 308 and/or sheath 310 can be fed through either opening 616, opening 618, and/or other openings formed by the arrangement of the bars in various spacers, such as spacers 60, 70, and 72. The board 300 can be fastened to the bracket 20, 22 such that the front surface 301 of the board 300 faces the rear surface 202 of the bracket 20, 22. It is contemplated that multiple spacers may be used for purposes other than providing additional space between the card reader and the vending machine. For example, a first spacer may be used to have a wireless communication device mounted in the first spacer, and a second spacer may be used to have another device (e.g., camera, optical sensor, microphone, additional wireless communication device) mounted in the second spacer. Other suitable positions and arrangements will be understood by one of skill in the art from the description herein.

Figure 8:
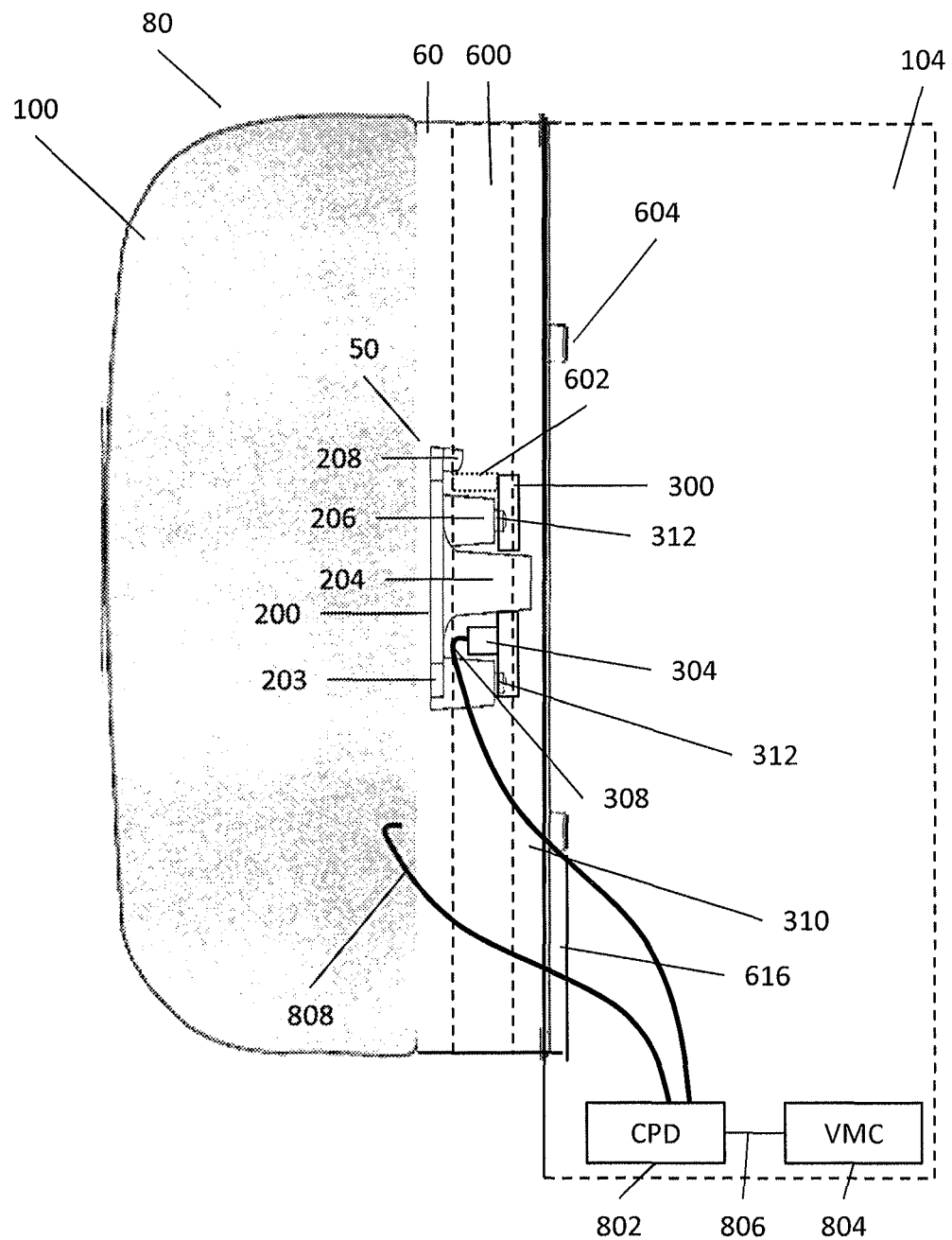
FIG. 8 is an illustration of a vending system according to aspects of the invention.

Referring next to FIG. 8, a vending system retrofitted for wireless communication is shown. The vending system 80 includes a card reader 100, a vending machine 104, and a spacer 60 positioned between the vending machine 104 and the card reader 100. Although the system 80 is shown with spacer 60, any other suitable spacer, such as spacers 70 and 72, may be used in conjunction with system 80. A wireless communication device 50 is attached in the spacer 60. The flanges 204 extend past the depth of the vertical bars 600, engaging the lips 210 with the rear sides of the vertical bars 600, and the horizontal tab 208 extends over the horizontal bar 602. The wires 308 of the device 50 are fed through the opening 616 in the spacer and an opening in the vending machine 104. The wires 308 are connected to a corresponding device in the vending machine 104 to electronically couple the device 50 to the vending machine 104. In the illustrated embodiment, the corresponding device is a cashless payment device (CPD) 802. Alternatively, the corresponding device may be another wireless communication device (e.g., a router, a Bluetooth transmitter, etc.), and/or other vending device(s) that will be understood by one of skill in the art from the description herein.

The CPD 802 may be coupled to the vending machine controller 804 of the vending machine 104. The CPD 802 may be coupled to the VMC 804 via a multi-drop bus 806 or other suitable communication medium in order to facilitate a cashless transaction. In the illustrated embodiment, the CPD 802 is also coupled to the card reader 100 via wire 808, e.g., to receive card data captured by the card reader 100 when a cashless payment card such as a credit or debit card is read by the card reader 100 and/or display messages on a display (not shown) of the card reader 100. Thus, the CPD 802 may be configured to interface with the VMC 804, the card reader 100, and the device 50, e.g., via three different corresponding communication standards. A suitable CPD 802 is an ePort or other cashless payment device available from USA Technologies of Malvern, Pa.

Accordingly, by utilizing the spacer 60 with the wireless communication device 50, the vending system 80 can be retrofitted for wireless communications via the wireless communication device 50.

Figure 9:
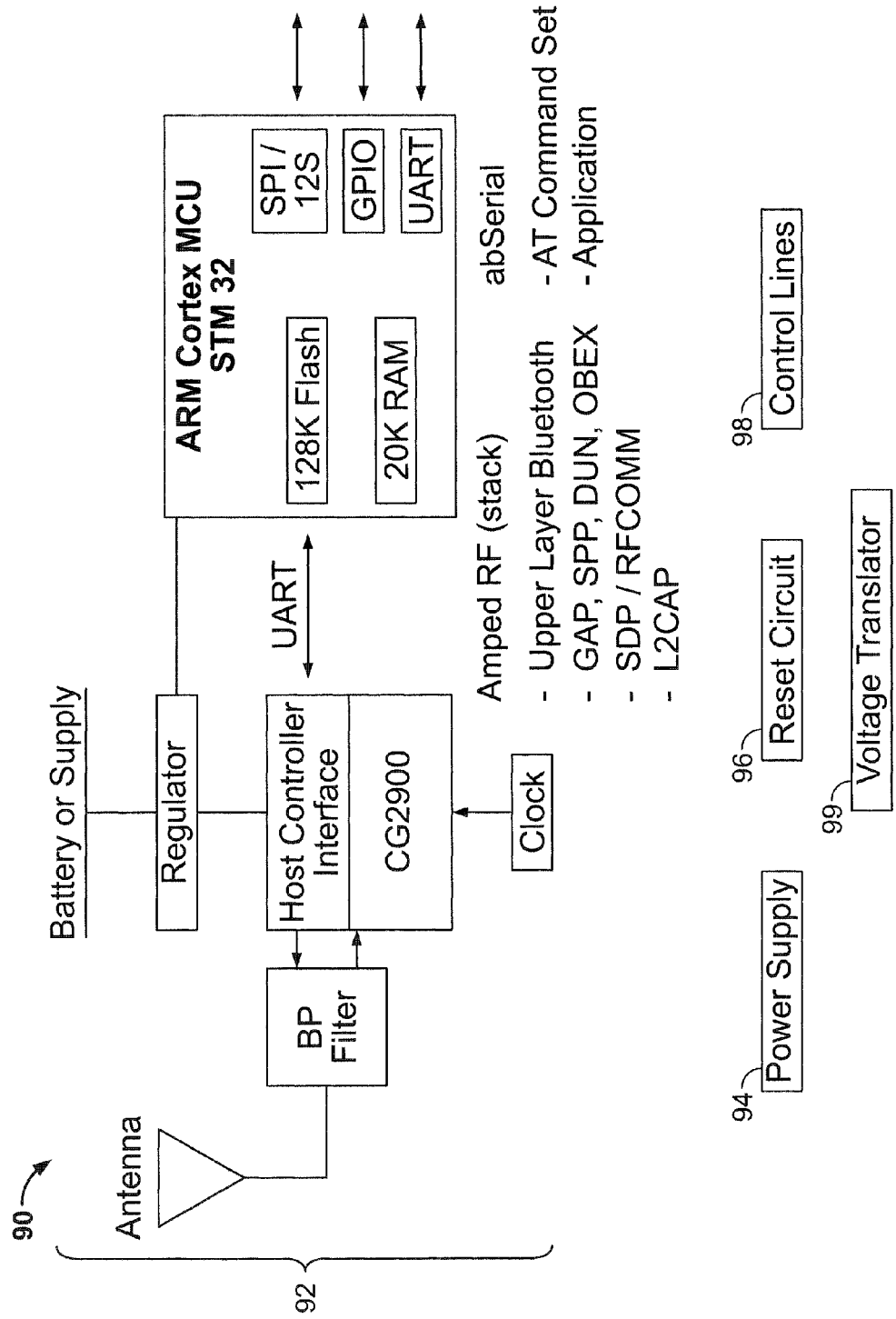
FIG. 9 is a functional block diagram of a wireless communication board in accordance with aspects of the invention.

At FIG. 9, a functional diagram of a wireless communication board 90 for use in retrofitting vending systems is shown in accordance with aspects of the invention. The board includes a module 92 for wireless communications. The module 92 may be a Bluetooth module (e.g., a double sided Bluetooth module). An example of a suitable module for use with the invention includes the BT43 module, which can be obtained from Amp'ed RF Wireless Technology of San Jose, Calif. The board 90 may be configured for wireless communications with multiple devices. For example, the wireless communication may be a Bluetooth transmission to or from a mobile device (e.g., a cellular telephone, tablet, portable computer, etc.) to permit wireless payment authorization and wireless vending. The wireless communication may be between the card reader, the vending machine, a vending controller, a mobile device, a server, additional wireless communication devices, other vending machines, etc. The illustrated wireless communication board 90 also includes a power supply 94 with remote control of power to the board 90, a reset circuit 96 to control the module 92, control lines 98 (e.g., for receiving in-application programming signals from a vending interface controller/cashless payment device, and a voltage translator 99 configured to translate input/output signals including data carrying signal lines to appropriate voltage levels. The power supply 94 may be remotely controlled (e.g., to power on/off) the components of the wireless communication board 90. For example, the power supply 94 may be remotely controlled by a vending interface controller/cashless payment device.

Figure 10:
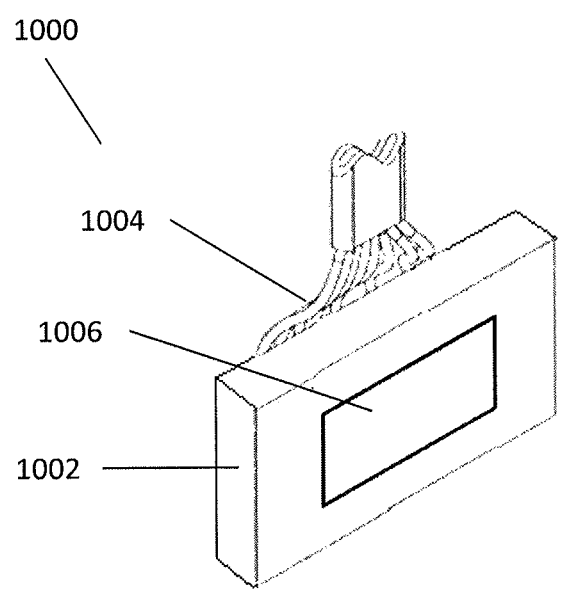
FIG. 10 is a view of a wireless communication device in accordance with aspects of the invention.

FIG. 10 depicts another example of a wireless communication device 1000 in accordance with aspects of the invention. The device 1000 includes a casing 1002, wires 1004, and an attachment mechanism 1006. The casing 1002 may be constructed of, for example, a polymer, a ceramic, etc. Within the casing 1002 is a wireless communication module, such as the wireless communication modules described above. In an embodiment, the casing 1002 is constructed to be waterproof (e.g., the casing 1002 encloses the wireless communication module). The wires 1004 are connected to the wireless communication module enclosed in the casing 1002 to facilitate communication between the wireless communication module and the vending machine (e.g., to the VMC of the vending machine directly or via a CPD as described above with reference to FIG. 8) when retrofitted to the vending machine. The area at which the wires 1004 connect to the wireless communication module may be coated with a material similar to the material from which the casing 1002 is constructed such that the wireless communication module remains fully enclosed.

The attachment mechanism 1006 is shown placed on a surface of the casing 1002 that is opposite to the side in which the wires 1004 connect to the wireless communication module enclosed by the casing 1002. The attachment mechanism 1006 is configured to attach the device 1000 such that a vending machine can be retrofitted for wireless communication. For example, the attachment mechanism 1006 may be configured to attach the device 1000 to a spacer, such as the spacers described above, directly to a credit card reader, locations within vending machines, and/or any other location suitable for retrofitting the vending machine for wireless communication. The attachment mechanism 1006 may be an adhesive, such as glue, tape, double-sided tape, Velcro™, a tie, tie-wrap, bracket with one or more fasteners such as screws, a hook and loop configuration, and/or other forms of attachment for suitably and reliably attaching the device 1000 to a location in relation to the vending machine.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A vending system, comprising:
   a card reader;
   a vending machine in communication with the card reader, the card reader having a frontmost surface facing away from the vending machine and a rearmost surface facing the vending machine;
   a spacer, positioned between the card reader and the vending machine, adapted for mounting the card reader to the vending machine, the spacer creating a space between the rearmost surface of the card reader and a front surface of the vending machine; and
   a wireless communication device electronically coupled to the vending machine, including:
      a bracket configured for attachment in the spacer; and
      a wireless communication board fastened to the bracket.

2. The system of claim 1, wherein the wireless communication board comprises at least one of a Bluetooth module, an NFC module, or a Wi-Fi module.

3. The system of claim 2, wherein the wireless communication board is a double-sided board configured for at least one of Bluetooth wireless communication, NFC wireless communication, or WiFi wireless communication.

4. The system of claim 1, wherein the wireless communication device is electronically coupled to a vending machine controller (VMC) of the vending machine or a vending interface controller coupled to the VMC.

5. The system of claim 1, wherein the bracket includes a tab that engages the spacer when the wireless communication device is attached in the spacer, preventing translation of the bracket in the spacer.

6. The system of claim 1, wherein the wireless communication board is configured to receive and transmit signals between the vending machine and at least one of a mobile device, another machine, or a billboard within communication range of the vending machine.

7. The system of claim 1, wherein the wireless communication board is water-proofed.

8. The system of claim 1, wherein the spacer comprises a first front spacer and a second rear spacer.

9. A vending system, comprising:
   a card reader;
   a vending machine in communication with the card reader;
   a spacer, positioned between the card reader and the vending machine, adapted for mounting the card reader to the vending machine, wherein the spacer includes a bar; and
   a wireless communication device electronically coupled to the vending machine, including:
      a bracket configured for attachment in the spacer, wherein the bracket includes at least one flange configured to engage the bar; and
      a wireless communication board fastened to the bracket.

10. The system of claim 9, wherein the at least one flange includes a lip that extends over the bar, thereby attaching the bracket in the spacer.

11. A method of retrofitting a vending machine for wireless communication, comprising the steps of:
    fastening a wireless communication assembly to a bracket;
    attaching the bracket in a spacer;
    mounting a card reader to the vending machine via the spacer such that a space is created between a rearmost surface of the card reader facing the vending machine and a front surface of the vending machine; and
    electronically coupling the wireless communication assembly to the vending machine.

12. The method of claim 11, wherein the coupling step further comprises coupling the wireless communication assembly to a vending controller of the vending machine.

13. The method of claim 11, wherein the coupling step further comprises coupling the wireless communication assembly to a wireless communication device of the vending machine.

14. A method of retrofitting a vending machine for wireless communication, comprising the steps of:
    fastening a wireless communication assembly to a bracket;
    attaching the bracket in a spacer, wherein the attaching step comprises:
       aligning a flange of the bracket with a bar in the spacer; and
       engaging the flange with the bar until a lip disposed on the flange extends over an end of the bar;
    mounting a card reader to the vending machine via the spacer; and
    electronically coupling the wireless communication assembly to the vending machine.

15. A device for retrofitting a vending machine with wireless communication, comprising:
    a bracket, including:
       at least one fastening projection; and
       at least one flange extending from an edge of the bracket; and
    a wireless communication assembly, including:
       a wireless communication board;
       a series of connections configured for electronic coupling of the board to the vending machine; and
       at least one aperture aligned with the at least one fastening projection of the bracket for fastening the board to the bracket; and
    wherein the at least one flange is configured to engage a spacer and attach the device to the spacer.

16. The device of claim 15, wherein the at least one flange further comprises a lip disposed on the at least one flange.

17. The device of claim 16, wherein the lip extends over an end of a bar in the spacer when the device is attached to the spacer.

18. The device of claim 15, wherein the bracket further comprises a concave portion.

19. The device of claim 15, wherein the wireless communication board comprises a wireless communication module.

20. The device of claim 19, wherein the wireless communication module is configured for at least one of Bluetooth communication, NFC communication, or Wi-Fi communication.

21. A vending system comprising:
a vending machine including a housing and a vending machine controller within the housing;
a card reader mounted to the vending machine housing with a spacer positioned between the card reader and the vending machine housing such that a space is created between a rearmost surface of the card reader facing the vending machine and a front surface of the vending machine, the spacer having an opening;
a wireless communication device positioned within the opening of the spacer; and
a cashless payment device located within the vending machine housing, the cashless payment device coupled to the vending machine controller, the card reader, and the wireless communication module.

22. The vending system of claim 21, wherein the cashless payment device is configured to communicate with the vending machine controller via a first communication standard over a multi-drop bus, to communicate with the card reader via a second communication standard corresponding to the card reader, and to communicate with the wireless communication device via a third communication standard corresponding to the wireless communication device.

23. The vending system of claim 21, wherein the wireless communication device is configured for communication with at least one of another vending system, a communication kiosk, a mobile user, a mobile device, a video billboard, or an access point.

24. The vending system of claim 21, wherein the wireless communication device is positioned within the opening of the spacer with an attachment mechanism.

25. A system, comprising:
a card reader;
a machine in communication with the card reader, the card reader having a frontmost surface facing away from the machine and a rearmost surface facing the machine;
a spacer, positioned between the card reader and the machine, adapted for mounting the card reader to the machine, the spacer creating a space between the rearmost surface of the card reader and a front surface of the machine; and
a wireless communication device electronically coupled to the machine, including:
a bracket configured for attachment in the spacer; and
a wireless communication board fastened to the bracket.

26. The system of claim 25, wherein the machine comprises at least one of a vending machine, a communication kiosk, a video billboard, or an access point.

27. A method of retrofitting a vending machine for wireless communication, comprising the steps of:
attaching a wireless communication device to the vending machine, the wireless communication device including a wireless communication module, wires coupled to the wireless communication module, and an attachment mechanism for attaching the wireless communication device to the vending machine, wherein the attaching comprises:
fastening the wireless communication device to a bracket;
aligning a flange of the bracket with a bar in a spacer;
engaging the flange with the bar until a lip disposed on the flange extends over an end of the bar;
mounting a card reader to the vending machine via the spacer; and
electronically coupling the wireless communication device to the vending machine by coupling the wires of the wireless communication device to the vending machine.

28. The method of claim 27, wherein the wireless communication device is coupled to a vending machine controller of the vending machine via a cashless payment device.

29. The method of claim 27, wherein the attachment mechanism is at least one of adhesive, tape, double-sided tape, Velcro™ a tie, tie-wrap, bracket with one or more fasteners, or a hook and loop configuration for attaching the wireless communication device to the vending machine.

* * * * *